United States Patent
Nakanishi

[11] Patent Number: 5,509,182
[45] Date of Patent: Apr. 23, 1996

[54] CLIP FOR ATTACHING SHEET MATERIAL TO A BODY PANEL

[75] Inventor: Hideaki Nakanishi, Toyohashi, Japan

[73] Assignee: Emhart Inc., Newark, Del.

[21] Appl. No.: 284,319

[22] Filed: Aug. 2, 1994

[30] Foreign Application Priority Data

Aug. 2, 1993 [JP] Japan ................. 5-042324 U

[51] Int. Cl.⁶ ............... A44B 17/00; F16B 21/00
[52] U.S. Cl. ................. 24/297; 24/289; 24/453; 411/508
[58] Field of Search ............ 24/297, 298, 453; 411/508, 510, 437

[56] References Cited

U.S. PATENT DOCUMENTS

| | | | |
|---|---|---|---|
| 4,122,583 | 10/1978 | Grittner et al. | 24/297 |
| 4,312,614 | 1/1982 | Palmer et al. | 24/297 |
| 4,890,966 | 1/1990 | Umezawa | 24/297 |
| 4,920,618 | 5/1990 | Iguchi | 24/453 |
| 5,291,639 | 3/1994 | Baum et al. | 24/297 |

*Primary Examiner*—Victor N. Sakran
*Attorney, Agent, or Firm*—E. D. Murphy

[57] ABSTRACT

A clip 1 has a head 2 and an engagement portion 3, and the head and the engagement portion is connected via a pair of arms 4, 4 which form a flange when hinges 5 in the middle thereof are bent radially outwardly. The clip can be fixed to a carpet 18 and the engagement portion is to be attached to a panel such as a vehicle body. The head 2 has a large-diameter flange 7 the surface of which has no hole and which presses a surface of the carpet, and a shank 8 extending from the flange downwardly to an extent that is the same as the thickness of the carpet. The engagement portion 3 has an engagement pawl 12 to engage with hooks hanging down from the head flange 7 when the engagement pawl is pressed onto the shank of the head 2, and an engagement portion shank 15 passing through a panel hole to bend radially.

2 Claims, 12 Drawing Sheets

CLIP FOR ATTACHING SHEET MATERIAL TO A BODY PANEL

FIELD OF THE INVENTION

The present invention relates to a clip for fixing a sheet member such as a carpet to a vehicle body or the like.

BACKGROUND OF THE INVENTION

There are known clips for fixing a sheet member such as a carpet to a vehicle body or the like. U.M. Publication No. 1-13844 discloses one example of such clip. This publicly known clip comprises a pantograph-shaped engagement strip, a shank and an engagement portion in engagement with a stud with the engagement portion formed with a flange. The elongated engagement strip and the shank are brought to pass through a hole in the sheet member and the flange of the engagement portion is brought into surface-contact with one side of the sheet member. Then, the pantograph shaped engagement strip, which now stays on the other side of the sheet member, is pressingly bent in to a flat condition to form a second flange which is associated with the flange of the engagement portion to attach the clip to the sheet member. Accordingly, this clip can previously be attached to the sheet member and by pressing the sheet member, so that the clip is easily attached to the stud standing on the panel. Nevertheless, the flattened pantograph shaped engagement strip of this clip is exposed on the top or visible surface of the carpet so that the appearance of the sheet member is made less attractive.

U.M. Laid-Open Application No. 5-22824 describes another clip for fixing a sheet member such as a carpet to a vehicle body or the like. This publicly known clip has a head and an engagement portion which are joined together by means of a pair of arms which form a flange when pantograph hinges at the middle of the arms are bent radially outwardly. This clip is convenient in that it can be mounted by working on the top surface of a carpet or the like, the attached clip can be fixed by pressing also from the top, and the clip can be removed after mounted on a panel such as a vehicle body. It is also possible to previously attach the clip to a sheet member. Since the arms are bent and locked so as to form a flange, however, the head flange and the shank are hollowed so that the engagement portion shank can be inserted into the hollow portion. Therefore, the head flange is formed with a large hold. The hole allows dust to get in and mars the appearance of the portion of the carpet or the like visible to the user.

OBJECTS AND ADVANTAGES

Accordingly, the present invention aims to provide a clip which is capable of being previously attached to a carpet or the like and does not mar the appearance of the sheet member.

According to the present invention, the head comprises a large-diameter flange for holding one side of the sheet member and having a continuous top surface with no aperture, and shanks extending from the large-diameter flange downwardly to an extent that is substantially the same as the thickness of the carpet, and the engagement portion comprises head-engagement means to come into engagement with the head when pressed into the head shanks and panel engagement means to come into engagement with the panel when pressed. Therefore, the clip can be previously attached to a carpet or the like and does not mar the appearance of the sheet member when attached. It can be attached to a panel with simple operation of just pressing regardless of such a condition that the panel is provided with either a hole or a stud standing thereon.

In order to attain the above-described object, according to the present invention, there is provided a clip for carpet or the like comprising a head and an engagement portion connected to the head through a pair of arms having hinges at the middle thereof to be bent radially outwardly to form a flange so that the clip is fixed to a sheet member such as a carpet by means of the head and the flange, and the engagement portion is attached to a panel such as a vehicle body. The clip is characterized in that the head comprises a large-diameter flange having a top surface of no hole and for holding one side of the sheet member, and shanks extending from the large-diameter flange downwardly to an extent that is substantially the same as the thickness of the carpet; and the engagement portion comprises head-engagement means to come into engagement with the head when pressed into the head shanks and panel engagement means to come into engagement with the panel when pressed.

In the present invention, the clip is preferably so made that the head-engagement means of the engagement portion comprises an engagement pawl to come into engagement with hooks downwardly extending from the head flange, and the panel engagement means of the engagement portion comprises a panel-engagement shank extending downwardly to be bent, the panel-engagement shank having a pulling guide extending further downwardly so that the panel engagement shank is fastened in a panel hole by pulling out the pulling guide extending downwardly from the panel hole. In another embodiment, the clip may be so made that the engagement portion comprises a hollow shank, and the head-engagement means of the engagement portion comprises engagement pawls formed on sides of the engagement portion to come into engagement with windows formed in the head shank, and the panel-engagement means of the engagement portion comprises engagement pawls formed in the through hole in the shank of the engagement portion to come into engagement with a stud fixed to the panel.

DETAILED DESCRIPTION OF THE DRAWINGS AND PREFERRED EMBODIMENTS

Figure 5:
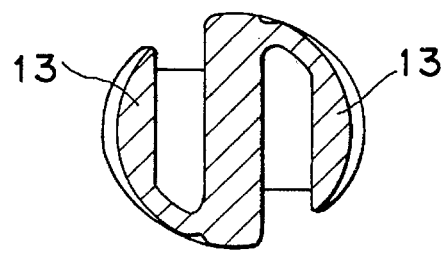
FIG. 5 is a sectional view taken along the line C—C of FIG. 1.
Figure 6:
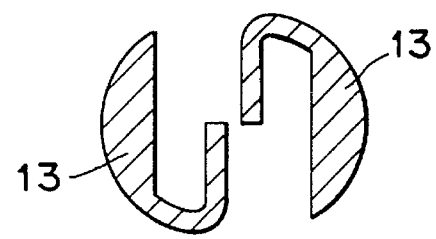
FIG. 6 is a sectional view taken along the line D—D of FIG. 1.
Figure 7:
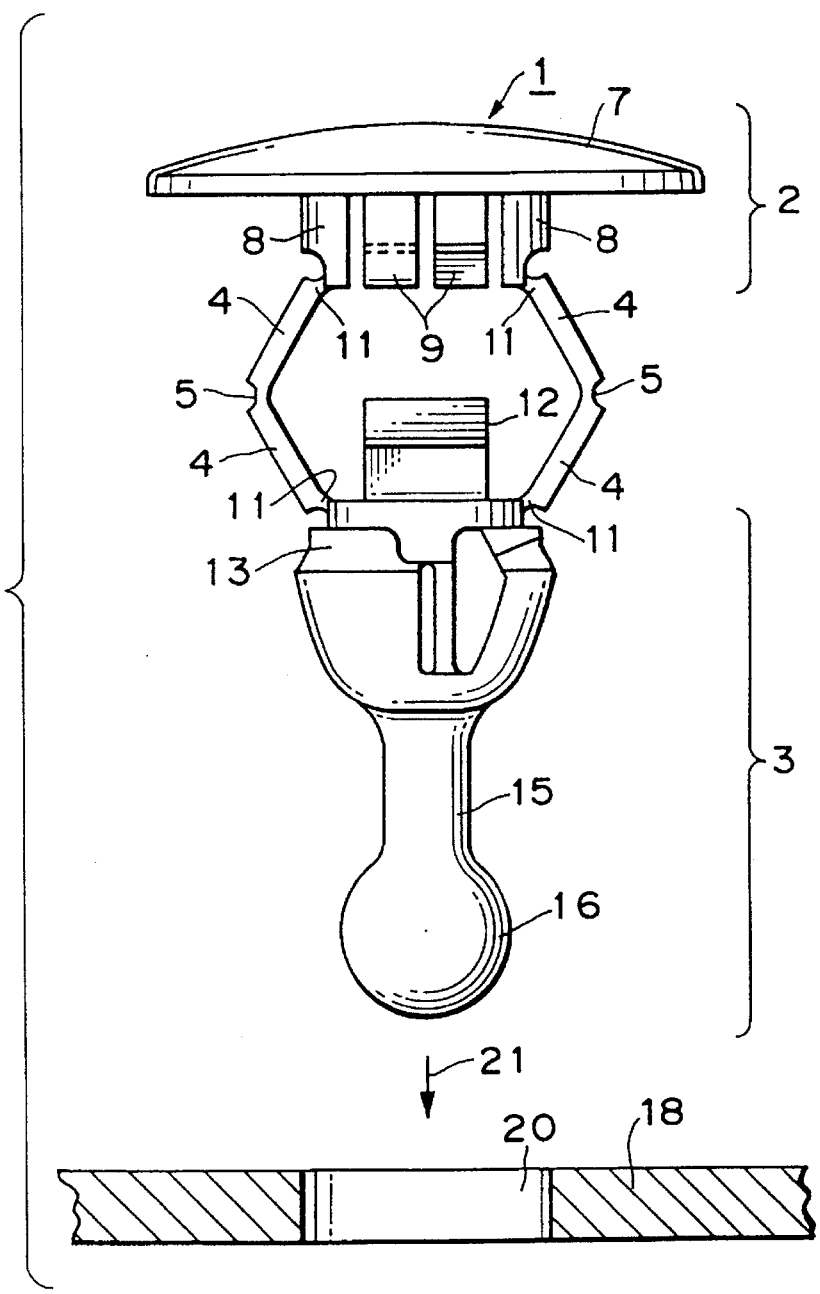
FIG. 7 shows a condition that the clip of FIG. 1 is being attached to a carpet.
Figure 8:
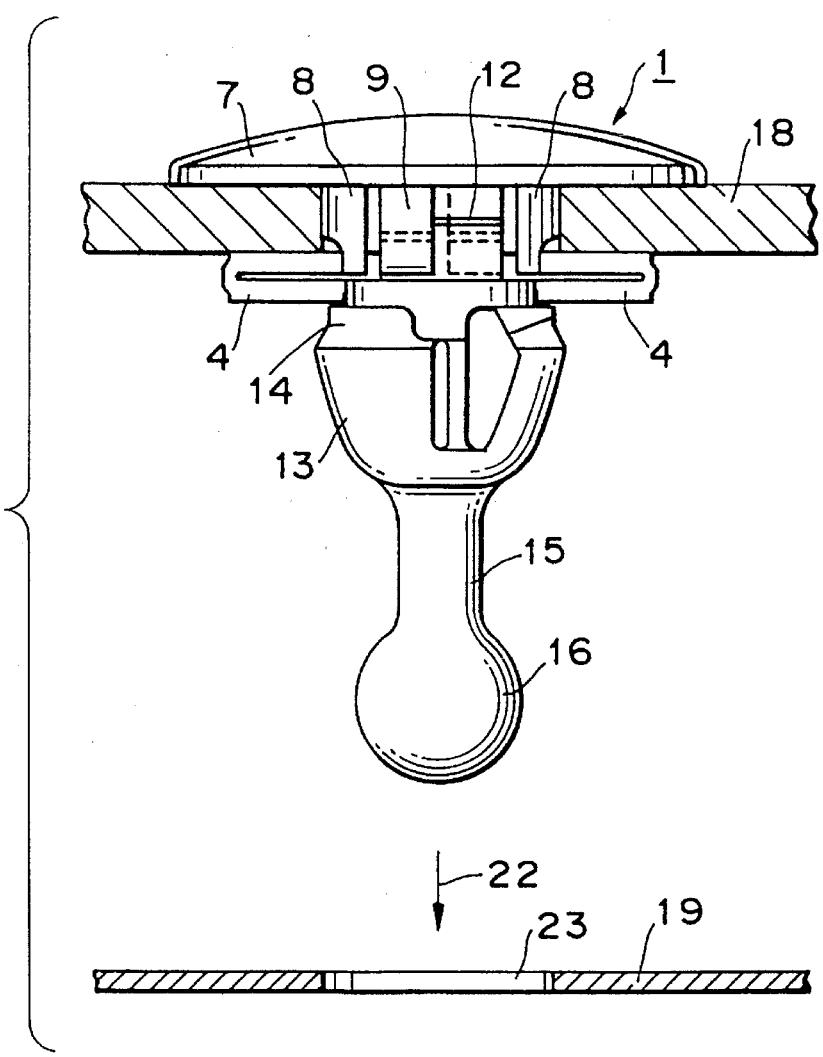
FIG. 8 shows a condition that the clip of FIG. 1 has been attached to the carpet and is being mounted on a panel.
Figure 9:
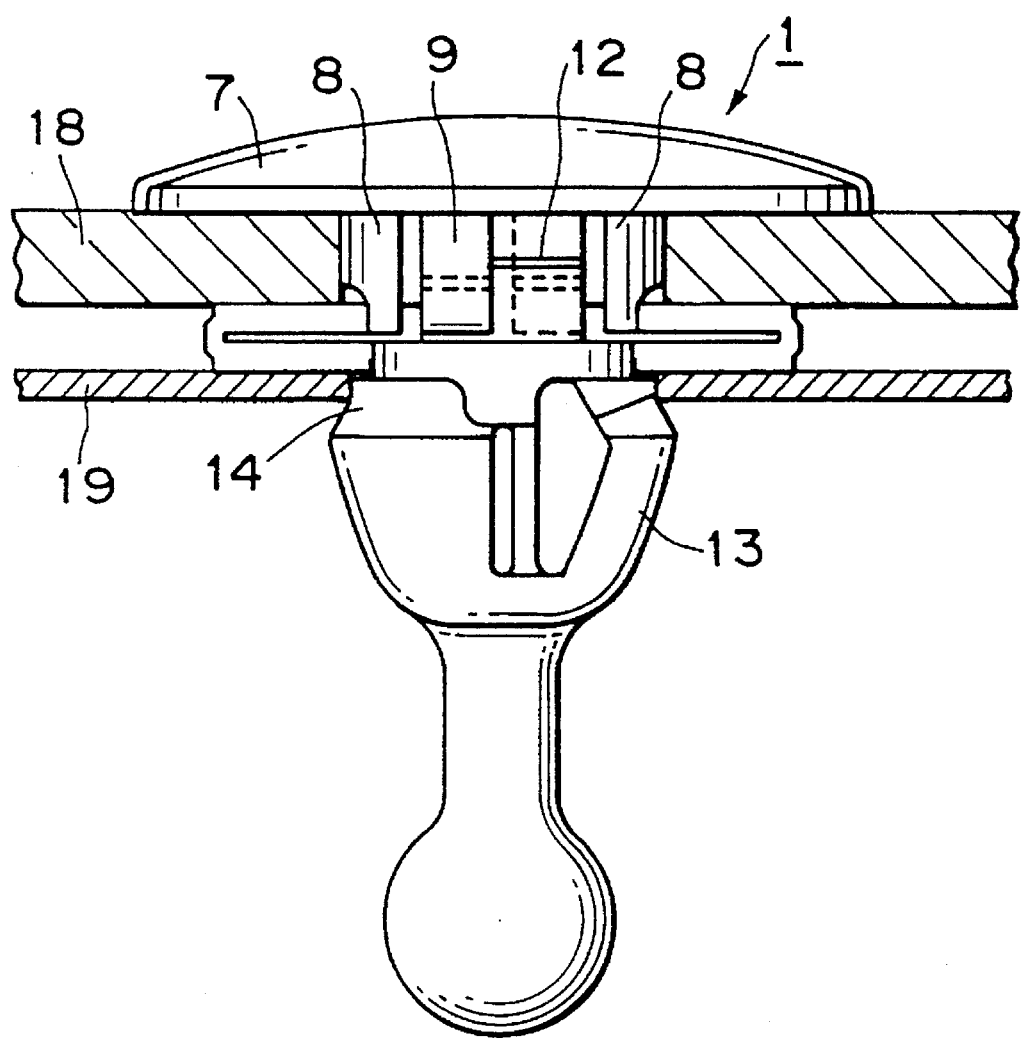
FIG. 9 shows a condition that the carpet is mounted on the panel by the clip of FIG. 1.

The present invention is described further by way of embodiments with reference to accompanying drawings. A clip 1 according to a first embodiment of the present invention is shown in FIGS. 1 through 9. FIGS. 1 through 6 show the structure of the clip 1 and FIGS. 7 through 9 show it in use. The clip 1 is made of a one-piece molding of plastic comprising a head 2, an engagement portion 3 and a pair of arms 4 to connect both the portions. Each arm 4 is formed with a hinge 5 in the middle thereof and forms a flange when bent radially outwardly about the hinge as the center.

Figure 1:
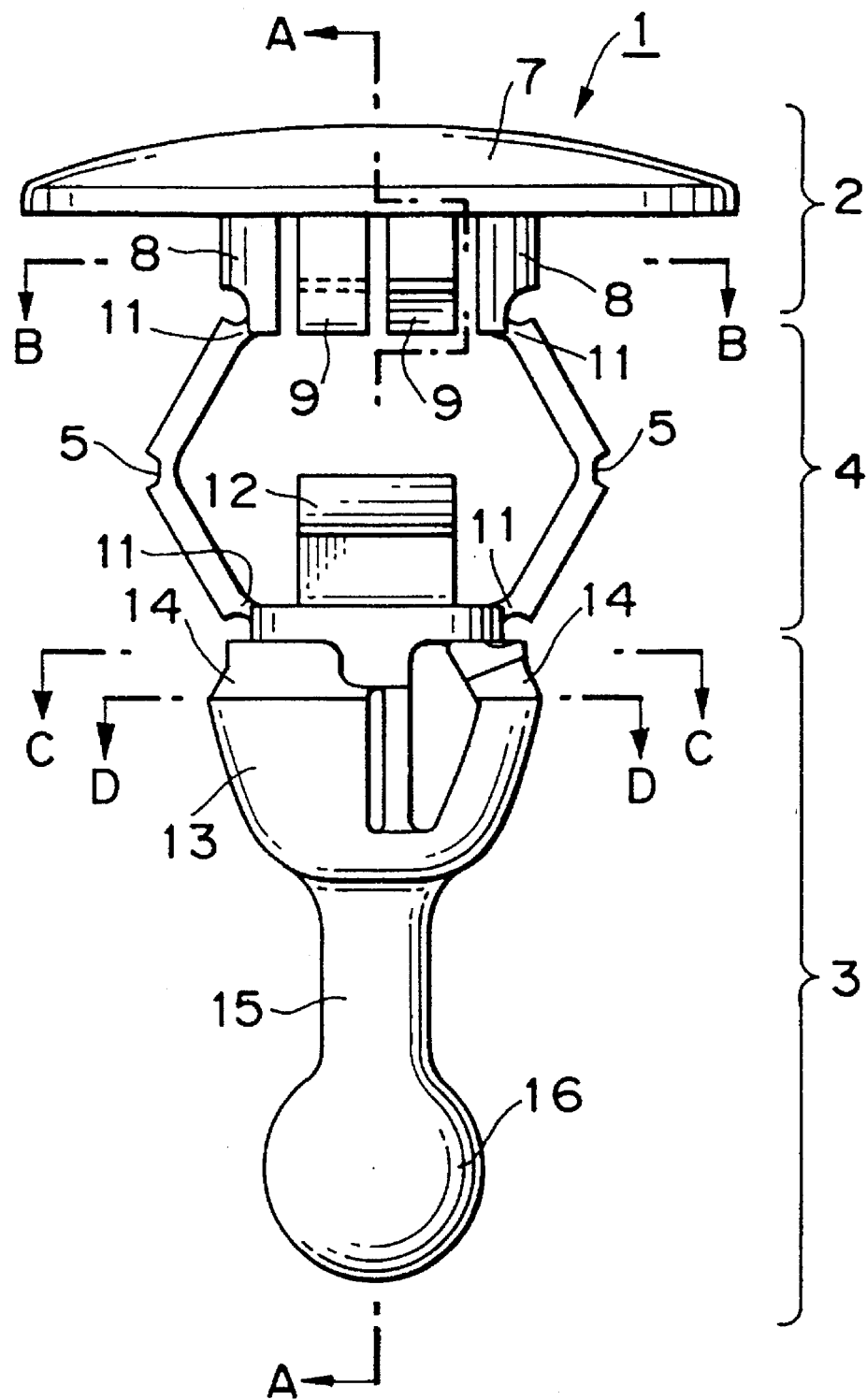
FIG. 1 is a front view of a first embodiment clip according to the present invention.
Figure 2:
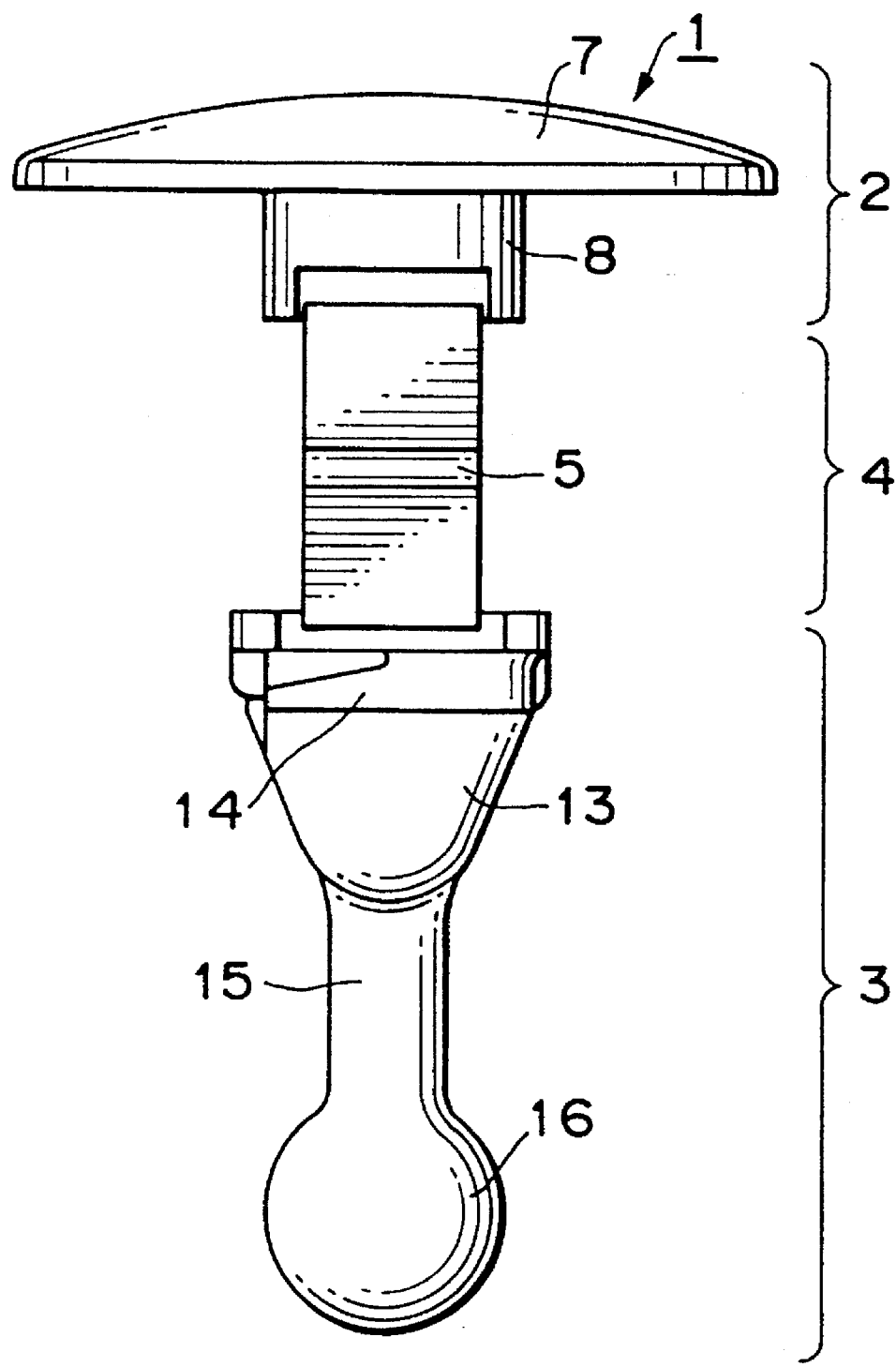
FIG. 2 is a side view of the clip of FIG. 1.
Figure 3:
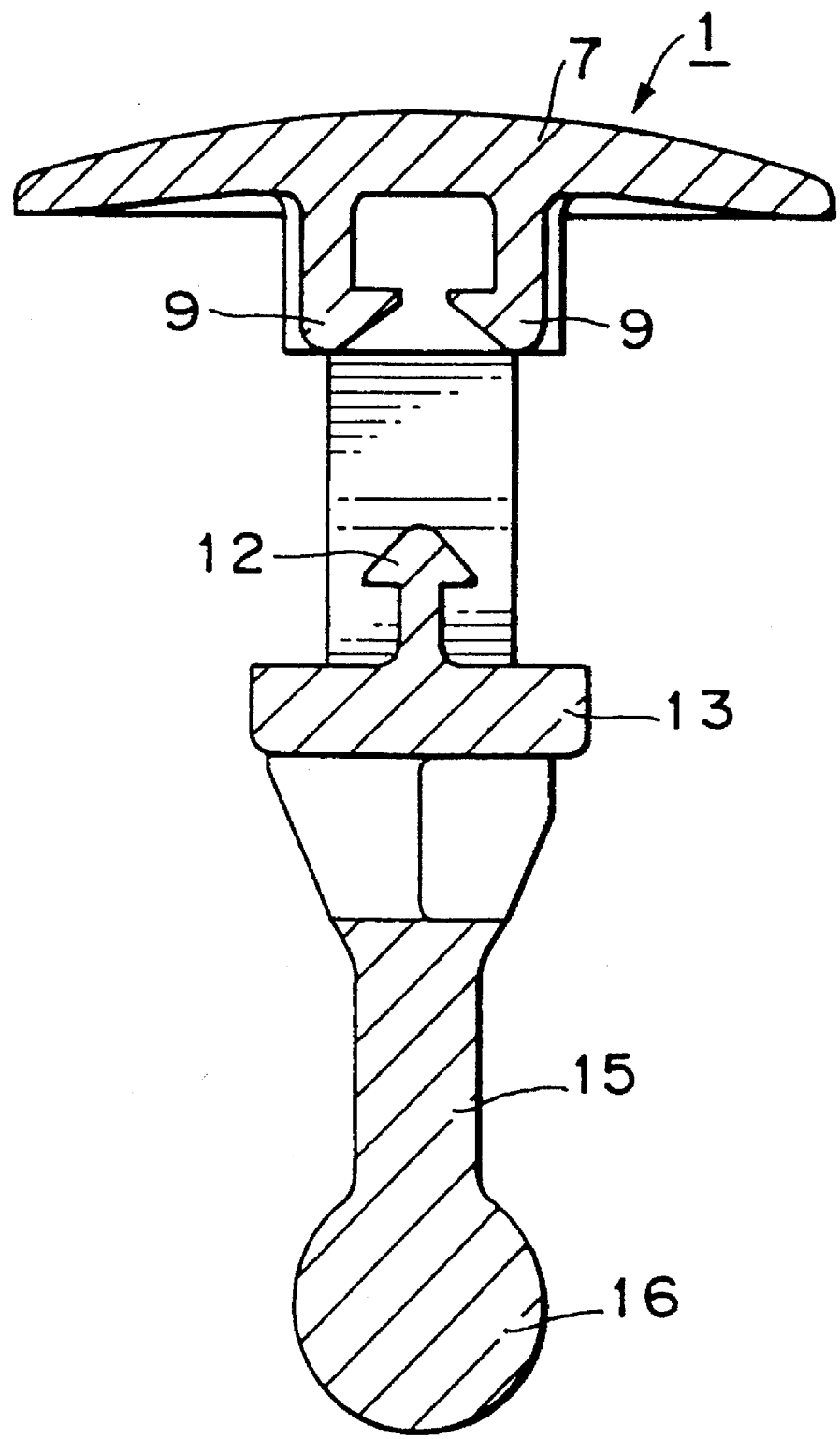
FIG. 3 is a sectional view taken along the line A—A of FIG. 1.
Figure 4:
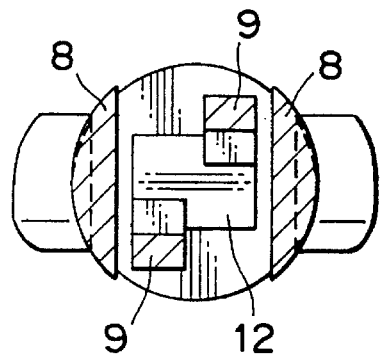
FIG. 4 is a sectional view taken along the line B—B of FIG. 1.

The head 2 comprises a large-diameter flange 7 for holding down the top of a sheet member such as a carpet with the flange and having a flat lower surface and a smooth and slightly convex top or visible surface with no aperture, and a pair of shanks 8 extending from the large-diameter flange to an extent that is substantially the same as the thickness of the carpet with each of the shanks being spaced apart from the other. A pair of hooks 9 extends downwardly from the flange 7 to be spaced apart from each other between the pair of shanks 8. As shown in FIGS. 1, 3 and 4, the two hooks 9 are slightly staggered for convenience for molding and are formed to make up one hook together. The arms 4 for forming a second flange extend respectively from the lower ends of the shanks 8 and hinges 11 are formed at the bases of the arms.

The engagement portion 3 comprises head-engagement means to come into engagement with the head when pressed into the latter and panel-engagement means to come into engagement with a panel such as a vehicle body. As the head-engagement means, the engagement portion 3 is provided with an arrow-shaped engagement pawl 12 to engage with hooks 9 extending downwardly from the head flange 7. As the panel-engagement means, the engagement portion 3 has a downwardly extending panel-engagement shank 13 which is capable of bending radially. As shown in FIG. 5, the shank 13 is substantially S-shaped in cross section at the base having the engagement pawl 12 so as to be bent radially inwardly. Slightly below this portion, the shank has a larger diameter as clearly shown in FIG. 1. and the larger diameter portion forms two overlapped C shapes in cross section as shown in FIG. 6 so as to be bent radially inwardly more easily. The outside of the shank 13 inclines to increase the diameter and forms a panel-engagement surface 14. From the base of the shank 13, the arms 4, 4 extend through hinges 11. A rod-shaped pulling guide 15 extends below the panel-engagement shank 13 and has a lower end which is formed with a knob 16.

With reference to FIGS. 7 through 9, the explanation is made about the procedure to attach the clip 1 constructed as described above to a carpet 18 and to mount the carpet 18 onto a panel 19 such as a vehicle body. To begin with, the pulling guide 15 of the clip 1 is inserted in a hole 20 of the carpet 18 as indicated by an arrow 21. When the knob 16 is further pulled to draw out the guide 15, the shanks 8, 8 are positioned to the hole 20, and the flange 7 is brought into surface-contact with the carpet 18. Then, the guide 15 is pressed onto the flange side while holding the flange 8 without getting away from the carpet 18. Then, the hinges 5 and 11 allow the pair of arms 4, 4 to be respectively bent radially outwardly about the center or the hinges 5 to form a second flange. At that time, the engagement pawl 12 comes in engagement with the hooks 9, 9 to keep the arms in the flange form and the clip 1 is attached to the carpet 18.

To fix the carpet 18, to which the clip 1 has been attached, to the panel 19, as shown by arrow 22 in FIG. 8, the knob 16 of the pulling guide 15 of the clip 1 is positioned at a hole 23 of the panel 19 and then the flange 7 is pressed down. When thus pressed, the guide 15 gets through the hole 23 and the shank 13 passes through the hole 23. The shank portion at the panel engagement surface 14 is bent radially inwardly once and then expands diametrically on the rear side of the panel 19 and the clip is attached as shown in FIG. 9.

A clip 25 according to a second embodiment of the present invention is described in the following, with reference to FIGS. 10 through 19. FIGS. 10 through 15 show the structure of the slip 25 and FIGS. 16 through 19 show it in use. The clip 25 is a one-piece molding of plastic comprising a head 26, an engagement portion 27 and a pair of arms 28 to connect both the portions. Each arm 28 is formed with a hinge 29 in the middle thereof and a second flange is formed when the arms are bent radially outwardly on the hinge as the center.

Figure 10:
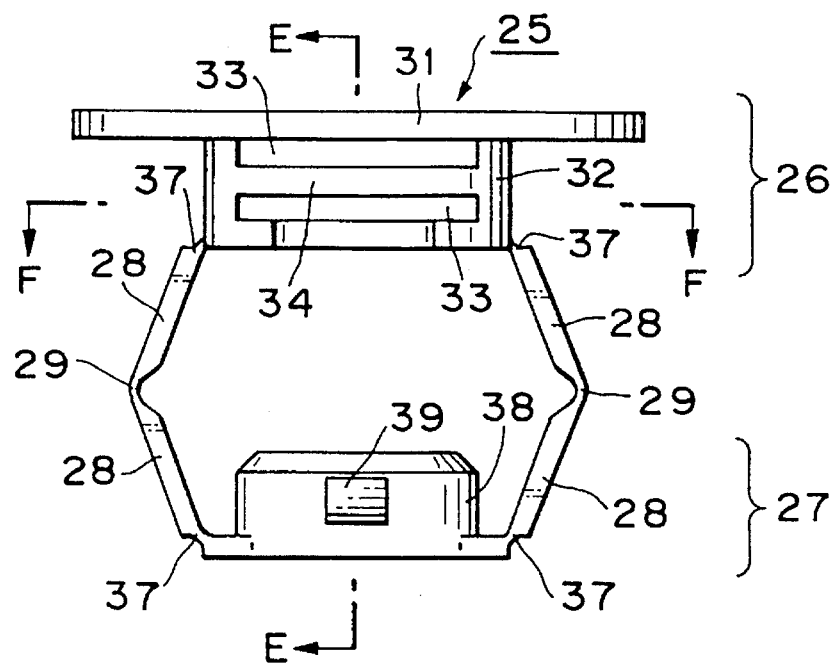
FIG. 10 is a front view of a second embodiment clip according to the present invention.
Figure 11:
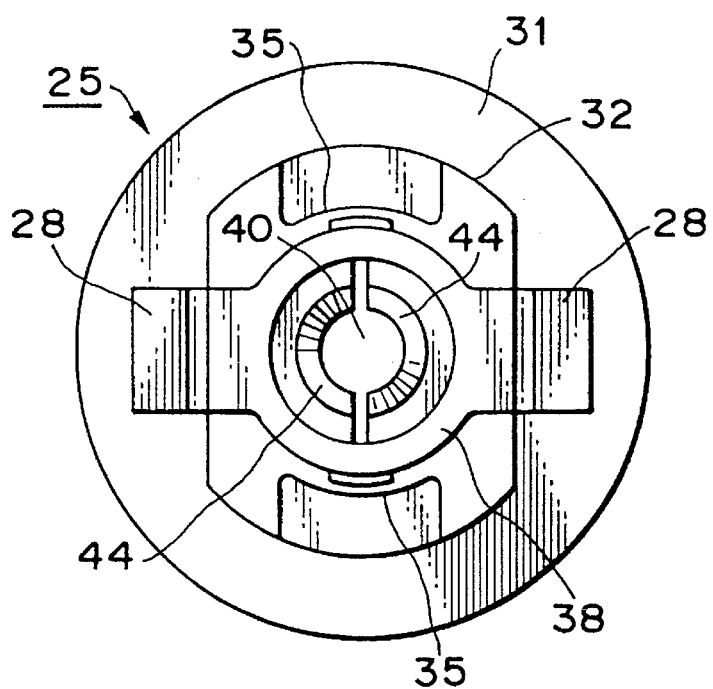
FIG. 11 is a bottom view of the clip of FIG. 10.
Figure 12:
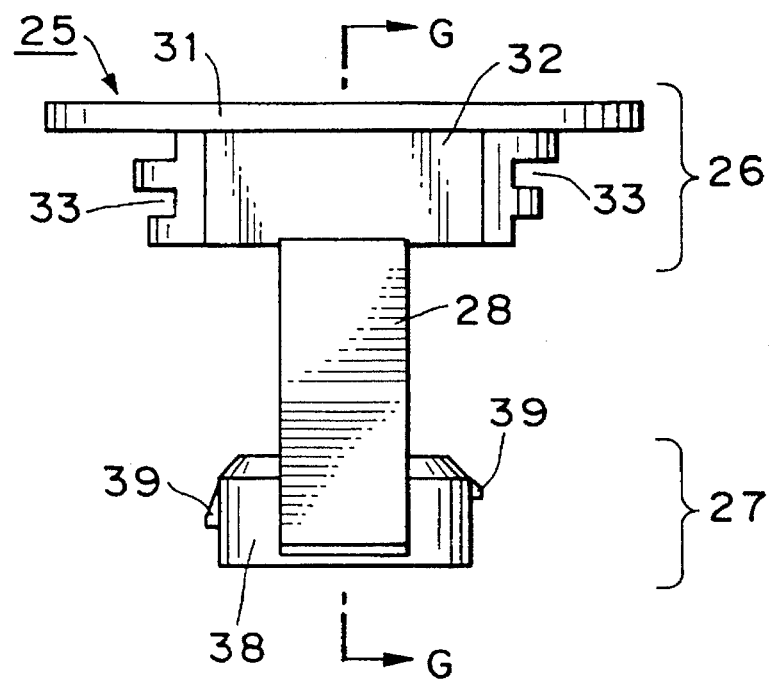
FIG. 12 is a side view of the clip of FIG. 10.

The head 26 comprises a large-diameter flange 7 for holding down the top of a sheet material such as a carpet with the flange and having a flat lower surface and a smooth top or visible surface having no aperture, and an annular shank 32 extending downwardly from the large-diameter flange to an extent that is substantially the same as the thickness of the sheet member and is formed with an internal space to receive an engagement portion 27 therein. On sides of the shank 32, horizontally elongated windows 33 are formed as shown in FIG. 10. The windows 33 are provided so as to face each other diametrically and are staggered heightwise for convenience for molding. A portion 34 of the shank below the windows 33 can be bent radially outwardly because of cutouts 35 shown in FIG. 11, the windows 33 and the internal space in the shank. Arms 28 for forming a second flange extends from the lower ends at two diametrically opposite points of the shank 32 with the hinges 37 formed at the bases of the arms.

Figure 13:
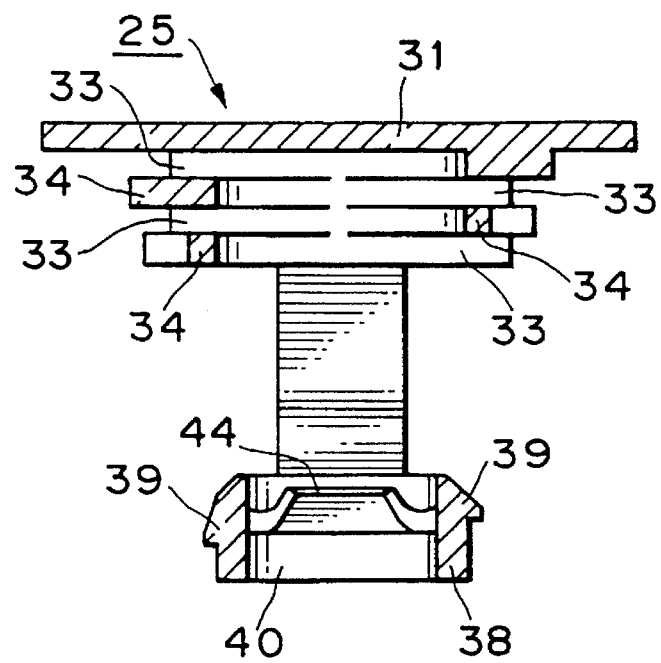
FIG. 13 is a sectional view taken along the line E—E of FIG. 10.
Figure 14:
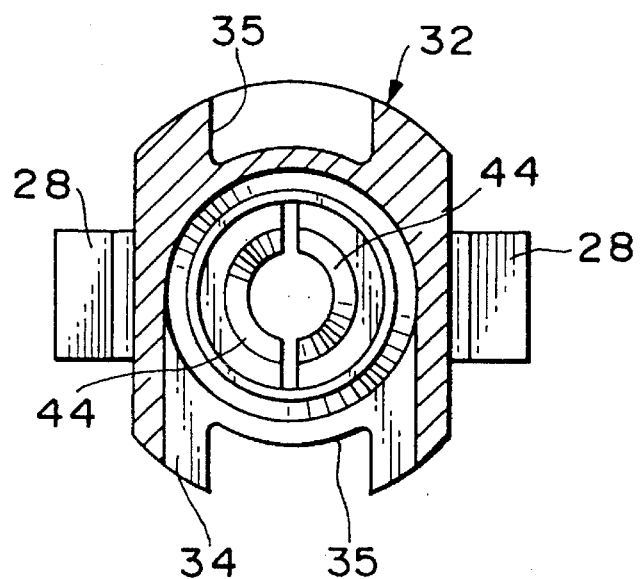
FIG. 14 is a sectional view taken along the line F—F of FIG. 10.
Figure 15:
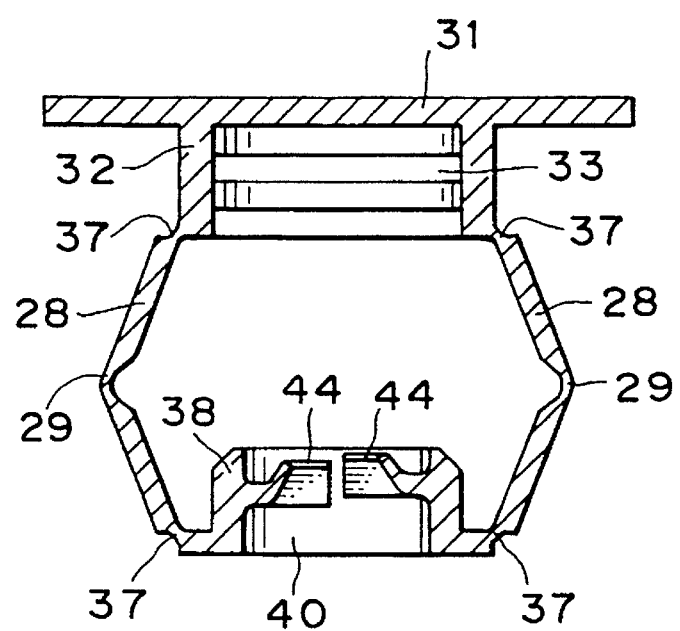
FIG. 15 is a sectional view taken along the line G—G of FIG. 10.
Figure 16:
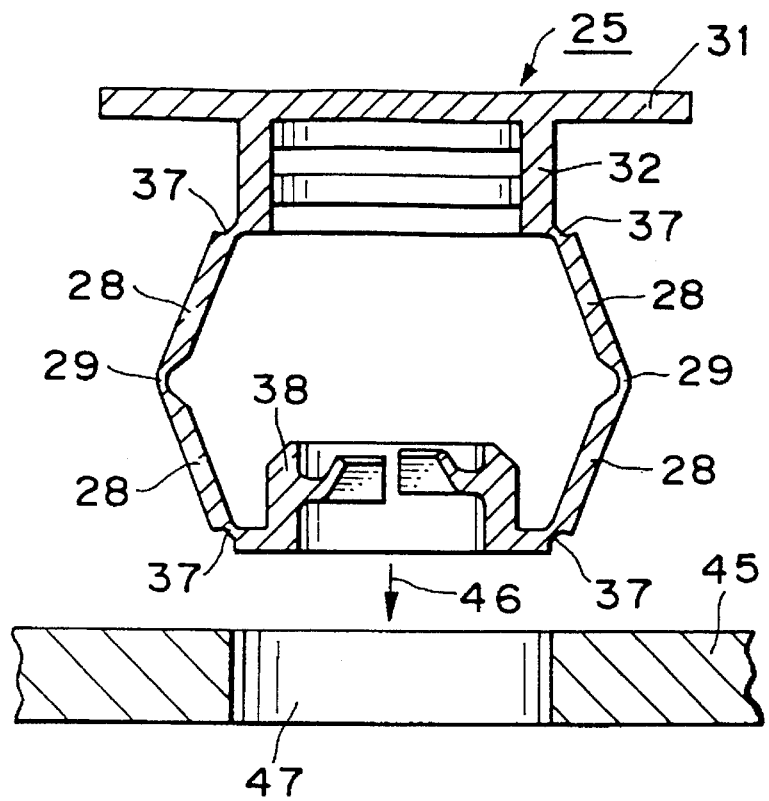
FIG. 16 shows a condition that the clip of FIG. 10 is being attached to a carpet.

The engagement portion 27 comprises a hollow shank 38 to be received into the space in the head shank 32, and the shank 38 is formed with head-engagement means and panel-engagement means. The sides of the shank 38 is formed with a pair of engagement pawls 39, 39 as the head-engagement means which engages with the windows 33 when pressed onto the head shank 32. The two engagement pawls 39 are formed at different heights as shown in FIG. 13 so as to meet the heights of the windows 33. The inner wall of a through hole 40 of the shank 38 is formed with a pair of engagement pawls 44 as the panel engagement means to engage with a threaded stud 43 standing on a panel 42 (See FIG. 17). From a base portion of the engagement portion shank 38, arms 28, 28 extend through hinges 37, 37, respectively.

Figure 17:
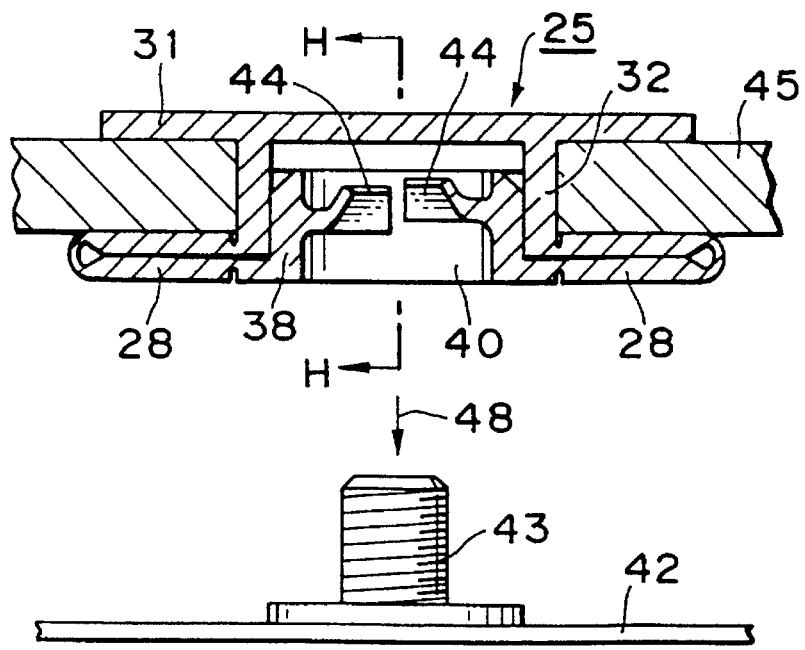
FIG. 17 shows a condition that the clip of FIG. 10 has been attached to the carpet and is being mounted on a panel.
Figure 18:
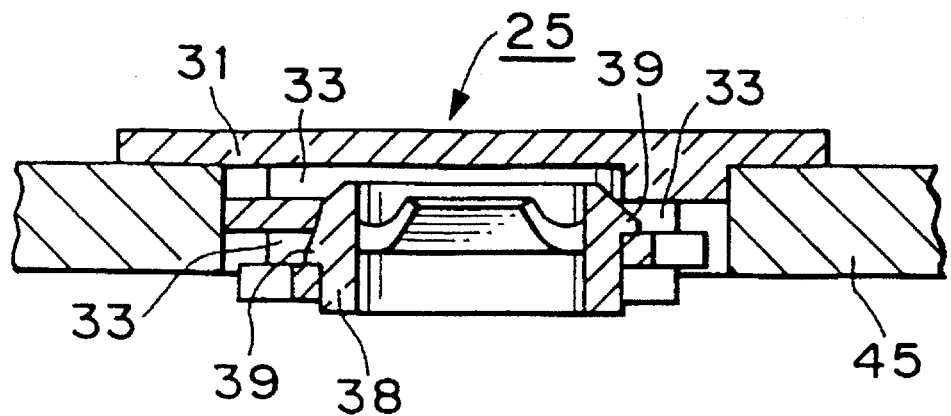
FIG. 18 is a sectional view taken along the line H—H of FIG. 17.

The procedure of attaching the clip 25 constructed as described above to a carpet 45 and mounting the carpet 45 on the panel 42 is described with reference to FIGS. 16 through 19. To begin with, the clip 25 is pressed in as indicated by an arrow 46 in FIG. 16 so that the engagement portion shank 38 and the arms 28 can pass through a hole 47 of the carpet 45. Then, upon pressing the engagement portion shank 38 into the space of the head shank 32 while keeping the flange 31 in surface-contact with the carpet 45, the paired arms 28, 28 are bent radially outwardly owing to the hinges 29 and 37 and a second flange is formed on the other side of the carpet. The clip 25 is attached to the carpet 45 by means of the second flange and flange 31 as illustrated in FIG. 17. Then, as shown in FIG. 18, the engagement pawls 39 outside the engagement portion shank 32 enter in the windows 33 of the head shank 32 to engage with them and the arms 28 are held in the state in which they form the second flange to keep the clip 25 attached to the carpet 45.

Figure 19:
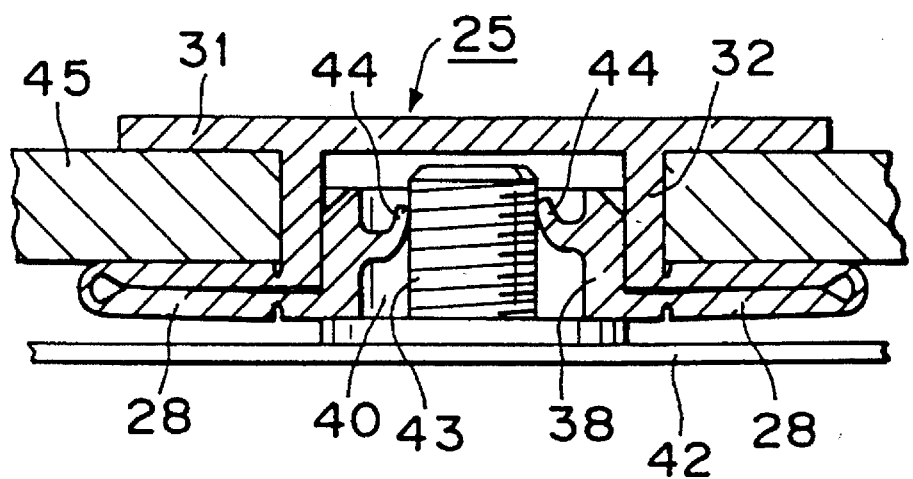
FIG. 19 shows a condition that the carpet is mounted on the panel by the clip of FIG. 10.

To fix the carpet 45, to which the clip 25 has been attached, to the panel 42, as shown by an arrow 48 in FIG. 17, the through hole 40 of the engagement portion shank 38 of the clip 25 is held to a stud 43 on the panel 42 and the flange 31 is directly pressed in, for example, with fingers. The pressing allows the stud 43 to pass through the through hole 40 of the engagement portion shank 38 and the engagement pawls 44, 44 come into engagement with troughs of the thread of the stud 43 as shown in FIG. 19. The clip 25 is thus fixed and the carpet 45 is mounted on the panel 42.

I claim:

1. A clip for attaching carpet to a vehicle body panel comprising a head comprising a flange for retaining the carpet, said head having a continuous upper surface;

a shank portion extending from said head;

an engagement member;

a pair of hinged arms connecting said engagement member to said head and arranged to flex outwardly when said engagement member is moved toward said head;

said engagement member comprising interlocking means including an engagement pawl for engaging said head when said member is moved toward said head, and panel attachment means for attaching said clip to the vehicle body panel, said panel attachment means comprising a panel-engagement shank extending through the panel, said panel-engagement shank having a pulling guide extending further, so that the panel engagement shank is fastened in a panel hole by pulling said pulling guide through the panel hole.

2. A clip for attaching carpet to a vehicle body panel comprising a head comprising a flange for retaining the carpet, said head having a continuous upper surface;

a shank portion extending from said head;

an engagement member;

a pair of hinged arms connecting said engagement member to said head and arranged to flex outwardly when said engagement member is moved toward said head:

said engagement member comprising a hollow shank interlocking means for engaging said head when said member is moved toward said head, said interlocking means including engagement pawls formed on sides of said engagement member to come into engagement with windows formed in said shank portion; and panel attachment means for attaching said clip to the vehicle body panel, said panel attachment means comprising engagement pawls for engaging a stud fixed to the panel.

* * * * *